(12) United States Patent
Baba et al.

(10) Patent No.: US 10,185,685 B2
(45) Date of Patent: Jan. 22, 2019

(54) SERIAL COMMUNICATION BRANCHING DEVICE AND SERIAL COMMUNICATION SYSTEM

(71) Applicant: FANUC CORPORATION, Yamanashi (JP)

(72) Inventors: Takahiro Baba, Yamanashi-ken (JP); Kenichi Ito, Yamanashi-ken (JP)

(73) Assignee: FANUC CORPORATION, Yamanashi (JP)

( * ) Notice: Subject to any disclaimer, the term of this patent is extended or adjusted under 35 U.S.C. 154(b) by 126 days.

(21) Appl. No.: 15/462,113

(22) Filed: Mar. 17, 2017

(65) Prior Publication Data

US 2017/0277644 A1    Sep. 28, 2017

(30) Foreign Application Priority Data

Mar. 22, 2016  (JP) ................................. 2016-057212

(51) Int. Cl.
  *G06F 13/42*   (2006.01)
  *G06F 13/364*  (2006.01)
  *G06F 13/40*   (2006.01)

(52) U.S. Cl.
  CPC .......... *G06F 13/364* (2013.01); *G06F 13/404* (2013.01); *G06F 13/4022* (2013.01); *G06F 13/4247* (2013.01); *G06F 13/4282* (2013.01)

(58) Field of Classification Search
  None
  See application file for complete search history.

(56) References Cited

U.S. PATENT DOCUMENTS 5,249,270 A * 9/1993 Stewart ................. G06F 13/423
                                          370/451
5,361,260 A * 11/1994 Mito ..................... H04L 12/423
                                          318/41

(Continued)

FOREIGN PATENT DOCUMENTS

JP    200488208 A    3/2004
JP    2008191989 A    8/2008

OTHER PUBLICATIONS

English Abstract for Japanese Publication No. 2008-191989 A, published Aug. 21, 2008, 2 pgs.

(Continued)

*Primary Examiner* — Cheng Yuan Tseng
(74) *Attorney, Agent, or Firm* — Fredrikson & Byron, P.A.

(57) ABSTRACT

A serial communication branching device and a serial communication system are provided. The serial communication branching device, which branches a plurality of slaves connected to the master by a daisy chain into a plurality of paths, is equipped with a first communication circuit that carries out communication with the master connected to a preceding stage side, a plurality of second communication circuits that carry out communication with the slaves of the paths connected to a subsequent stage side, and a path selection circuit disposed between the first communication circuit and the second communication circuits. In the case that a slave connected on the subsequent stage side transmits a reply signal to the master responsive to a transmission signal transmitted from the master, the path selection circuit selects a path of the slave that transmits the reply signal, and outputs the reply signal from the selected path to the master.

14 Claims, 11 Drawing Sheets

(56) References Cited

U.S. PATENT DOCUMENTS

| | | | | |
|---|---|---|---|---|
| 5,715,475 A * | 2/1998 | Munson | ............ | H04L 12/40117 |
| | | | | 348/E7.084 |
| 6,901,503 B2 * | 5/2005 | Barlow | ................ | G06F 1/3203 |
| | | | | 712/210 |
| 8,433,838 B2 * | 4/2013 | Crockett | ............. | G06F 13/4291 |
| | | | | 710/110 |
| 9,252,969 B2 * | 2/2016 | Rohatschek | .......... | H04L 12/422 |
| 9,454,504 B2 * | 9/2016 | Evans | ................ | G06F 13/4291 |
| 9,858,235 B2 * | 1/2018 | Matlock | ................ | G06F 13/387 |
| 2008/0189445 A1 * | 8/2008 | Hada | ................... | G05B 19/042 |
| | | | | 710/10 |

OTHER PUBLICATIONS

English Abstract and Machine Translation for Japanese Publication No. 2004-088208 A, published Mar. 18, 2004, 14 pgs.

\* cited by examiner

SERIAL COMMUNICATION BRANCHING DEVICE AND SERIAL COMMUNICATION SYSTEM

CROSS-REFERENCE TO RELATED APPLICATION

This application is based upon and claims the benefit of priority from Japanese Patent Application No. 2016-057212 filed on Mar. 22, 2016, the contents of which are incorporated herein by reference.

BACKGROUND OF THE INVENTION

Field of the Invention

The present invention relates to a serial communication branching device for branching a plurality of slaves that are connected to a master, into a plurality of paths, and to a serial communication system equipped with such a serial communication branching device.

Description of the Related Art

Conventionally, in order to input and output input signals (DI signals) and output signals (DO signals) between a numerical controller and machine tools, a plurality of external signal input/output devices (slaves) are connected to the numerical controller (master) by a daisy chain.

In Japanese Laid-Open Patent Publication No. 2008-191989, there is disclosed, in a configuration in which a plurality of external signal input/output devices are connected to a numerical controller by a daisy chain, a numerical controller, which is capable of detecting a mistake in a layout configuration, and automatically assigning an identification number (group number) to each of the external signal input/output devices with ease, even in the case that the layout configuration of the external signal input/output devices is changed.

SUMMARY OF THE INVENTION

However, when a plurality of such external signal input/output devices are connected to the numerical controller by a daisy chain, the wiring length becomes increased in length, depending on the layout positions of the numerical controller and the plurality of external signal input/output devices. Further, when the number of external signal input/output devices that are connected to the numerical controller by the daisy chain is large, the wiring length is even further increased.

Thus, the present invention has the object of providing a serial communication branching device and a serial communication system which is capable of suppressing an increase in the wiring length, even in the case that a master and a plurality of slaves are connected by a daisy chain.

According to a first aspect of the present invention, there is provided a serial communication branching device, which in the case that serial communication is carried out between a master and a plurality of slaves connected to the master by a daisy chain, branches the plurality of slaves into a plurality of paths, including a first communication circuit configured to carry out communication with the master connected to a preceding stage side of the serial communication branching device, a plurality of second communication circuits configured to carry out communication with the slaves of the paths connected to a subsequent stage side of the serial communication branching device, and a path selection circuit disposed between the first communication circuit and the second communication circuits, wherein, in the case that one slave of the slaves connected on the subsequent stage side transmits a reply signal to the master responsive to a transmission signal transmitted from the master, the path selection circuit selects, from among the paths, a path of the one slave that transmits the reply signal, and outputs the reply signal of the selected path to the master connected to the preceding stage side.

In accordance with this configuration, the wiring length of signal lines that connect the master and the plurality of slaves by a daisy chain can be made shorter. Further, transmission of reply signals to the master can be performed in such a manner that the reply signals transmitted from the slaves of the respective paths connected to the subsequent stage do not collide with each other.

In the serial communication branching device according to the first aspect of the present invention, the path selection circuit may select the path on the basis of a path selection signal sent from the one slave that transmits the reply signal. In accordance with this feature, it is possible to reliably return to the master the reply signals transmitted by the slaves responsive to the transmission signals transmitted by the master.

In the serial communication branching device according to the first aspect of the present invention, the path selection circuit may include a plurality of switches configured to switch between whether or not the reply signals from the plurality of paths are output to the master connected to the preceding stage side, and based on the path selection signal, one of the switches corresponding to the path of the one slave that transmits the reply signal may be turned on. In accordance with this feature, with a simple configuration, it is possible to reliably return to the master the reply signals transmitted by the slaves responsive to the transmission signals transmitted by the master.

In the serial communication branching device according to the first aspect of the present invention, the serial communication branching device and the slaves of the plurality of paths may be connected by transmission signal lines, reply signal lines, and path selection signal lines provided corresponding respectively to the plurality of paths, and the path selection circuit may turn on, among the switches, a switch of the path corresponding to one of the path selection signal lines through which the path selection signal has been transmitted.

In the serial communication branching device according to the first aspect of the present invention, the serial communication branching device and the slaves of the plurality of paths may be connected by transmission signal lines and reply signal lines provided corresponding respectively to the plurality of paths, and when the path selection circuit detects the path selection signal that the one slave that transmits the reply signal has transmitted through one of the reply signal lines prior to transmission of the reply signal, the path selection circuit may turn on, among the switches, a switch of the path corresponding to the one of the reply signal lines through which the path selection signal has been transmitted.

In the serial communication branching device according to the first aspect of the present invention, the plurality of switches may be provided in the reply signal lines corresponding respectively to the paths.

In the serial communication branching device according to the first aspect of the present invention, a slave number may be assigned to each of the plurality of slaves, the master may transmit the transmission signal to which the slave number is appended, one of the slaves that has the slave number appended to the transmission signal may transmit the reply signal, and the path selection circuit may select the path of the one slave that transmits the reply signal on the basis of the slave number included within the transmission signal. In accordance with this feature, it is possible to reliably return to the master the reply signals transmitted by the slaves responsive to the transmission signals transmitted by the master.

In the serial communication branching device according to the first aspect of the present invention, the path selection circuit may include a table storing therein, in association with each of the paths, the slave number of each of the slaves that belong to the paths, and using the table and the slave number appended to the transmission signal, the path selection circuit may select the path of the one slave that transmits the reply signal. In accordance with this feature, with a simple configuration, it is possible to reliably return to the master the reply signals transmitted by the slaves responsive to the transmission signals transmitted by the master.

In the serial communication branching device according to the first aspect of the present invention, the path selection circuit may include a plurality of switches configured to switch between whether or not the reply signals from the plurality of paths are output to the master connected to the preceding stage side, and based on the slave number included within the transmission signal, one of the switches corresponding to the path of the one slave that transmits the reply signal may be turned on. In accordance with this feature, with a simple configuration, it is possible to reliably return to the master the reply signals transmitted by the slaves responsive to the transmission signals transmitted by the master.

In the serial communication branching device according to the first aspect of the present invention, in the case that an allocation signal for allocating one of the slave numbers from the master to one of the slaves is received, the path selection circuit may sequentially select one from among the plurality of paths, whereby the slave numbers may be allocated to the slaves of each of the paths. In accordance with this feature, it is possible to appropriately allocate slave numbers respectively to the plurality of slaves that are branched into a plurality of paths by the serial communication branching device.

In the serial communication branching device according to the first aspect of the present invention, the path selection circuit may select the paths in accordance with a predetermined order. Thus, it is possible to allocate the slave numbers sequentially from the slaves of paths having a higher priority.

In the serial communication branching device according to the first aspect of the present invention, the master may transmit the allocation signal including the slave number to the slaves or the serial communication branching device connected to the subsequent stage, and when an allocation reply signal is transmitted from one of the slaves, the master may retransmit the allocation signal including a new slave number incremented by one from the previously transmitted slave number. In addition, when a slave to which a slave number is not allocated receives the allocation signal, the slave acquires the slave number of the received allocation signal as its own slave number, and the slave transmits the allocation reply signal to the master, another slave, or the serial communication branching device that is connected to the preceding stage, whereas when a slave to which a slave number is allocated receives the allocation signal, the slave may transmit the received allocation signal to another slave or the serial communication branching device that is connected to the subsequent stage. Further, the path selection circuit may select one of the plurality of paths, may transmit the received allocation signal to the slaves of all of the paths, and may transmit the allocation reply signal from the selected path to the master or the slave connected to the preceding stage, and in the case that, after transmitting the allocation signal, the allocation reply signal has not been transmitted from the selected path for a predetermined period of time or greater, the path selection circuit may select a path which has not yet been selected.

In the serial communication branching device according to the first aspect of the present invention, the path selection circuit may cancel the slave numbers that were acquired by the slaves of paths which have not yet been selected. In accordance with this feature, slave numbers can appropriately be allocated to the slaves of each of the paths, and the same slave number is not allocated to a plurality of the slaves.

A serial communication system according to a second aspect of the present invention is equipped with the above-described serial communication branching device, the master, and the plurality of slaves. In accordance with this configuration, the wiring length of signal lines that connect the master and the plurality of slaves by a daisy chain can be made shorter. Further, transmission of reply signals to the master can be performed in such a manner that the reply signals transmitted from the slaves of the respective paths connected to the subsequent stage do not collide with each other.

According to the present invention, the wiring length of signal lines that connect the master and the plurality of slaves by a daisy chain can be made shorter. Further, transmission of reply signals to the master can be performed in such a manner that the reply signals transmitted from the slaves of the respective paths connected to the subsequent stage do not collide with each other.

The above and other objects, features, and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Preferred embodiments of a serial communication branching device and a serial communication system according to the present invention will be presented and described in detail below with reference to the accompanying drawings.

Figure 1:
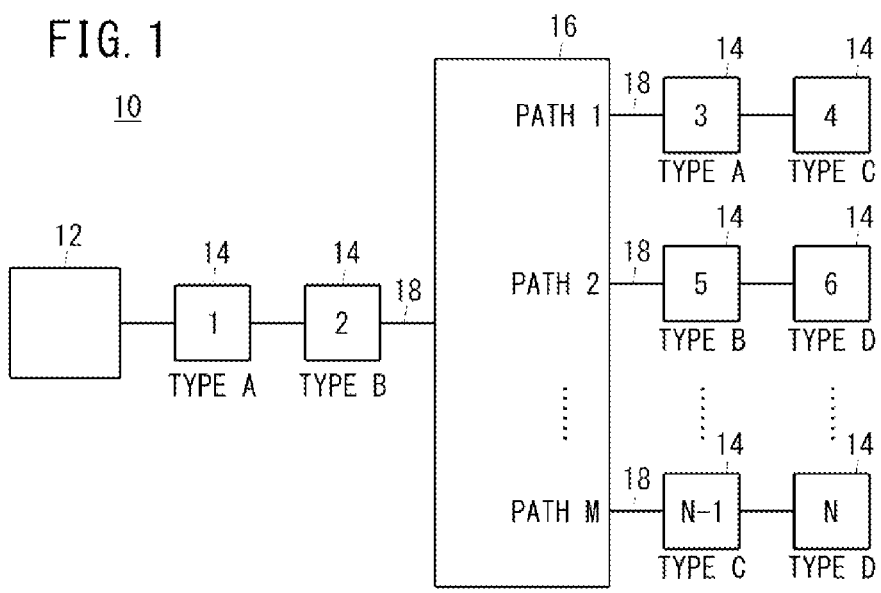
FIG. 1 is a diagram showing a configuration of a serial communication system that carries out serial communication according to an embodiment of the present invention.

FIG. 1 is a diagram showing the configuration of a serial communication system 10 that carries out serial communication according to an embodiment of the present invention. The serial communication system 10 includes a numerical controller (CNC) 12, a plurality of (N number of) external signal input/output devices (I/O units) 14, and a serial communication branching device 16. The numerical controller (hereinafter referred to as a master) 12 is a device that controls a machine tool or a robot. A plurality of the external signal input/output devices (hereinafter referred to as slaves) 14 serve to control input and output of input signals (DI signals) and output signals (DO signals) between the master 12 and the machine tool or the robot, and are connected by a daisy chain to the numerical controller 12. The serial communication branching device 16 serves to carry out branching of the plurality of slaves 14 into a plurality of (M number of) paths. The master 12, the plurality of slaves 14, and the serial communication branching device 16 are connected by signal lines (cables) 18 for serial communication. Therefore, the slaves 14 in each path and the serial communication branching device 16 also are connected by the signal lines 18, which are provided for each path. Further, the master 12, the slaves 14, and the serial communication branching device 16 include non-illustrated control units (computers) therein.

Unless otherwise specified, when one slave 14 receives signals from the master 12, another slave 14, or the serial communication branching device 16, which is connected to a preceding stage of the one slave 14, the one slave 14 transmits the received signals directly and without modification, to still another slave 14 or the serial communication branching device 16 connected to a subsequent stage of the one slave 14. Further, when one slave 14 receives signals from the master 12, another slave 14, or the serial communication branching device 16, which is connected to the subsequent stage, the one slave 14 transmits the received signals directly and without modification, to the master 12, still another slave 14, or the serial communication branching device 16 that is connected to the preceding stage. In accordance therewith, communication can be carried out between the master 12 and each of the slaves 14.

Numbers that are assigned to the slaves 14 in FIG. 1 are indicative of a slave number (Gr ID (Group ID)). In principle, the slave numbers are assigned as 1, 2, . . . , in order from the slave 14 nearest to the master 12, however, concerning slaves 14 of the respective paths after the serial communication branching device 16, slave numbers are assigned thereto according to the priority of the paths (predetermined order of the paths). Moreover, concerning slaves 14 that lie within the same path, slave numbers are assigned thereto in order from the slave 14 on the side of the master 12 (or the side of the serial communication branching device 16).

As shown in the example of FIG. 1, between the master 12 and the serial communication branching device 16, two slaves 14 are connected by a daisy chain. For this reason, the slave number "1" is given to the slave 14 connected on the subsequent stage from the master 12, and the slave number "2" is given to the slave 14 connected further subsequently thereto. Further, in the example shown in FIG. 1, in each of the paths, two slaves 14 are connected by a daisy chain to the serial communication branching device 16. Therefore, the slave number "3" is given to the slave 14 connected on the subsequent stage from the serial communication branching device 16 in the path of the first priority (hereinafter referred to as path 1), and the slave number "4" is given to the slave 14 connected further subsequently thereto. Further, the slave number "5" is given to the slave 14 connected on the subsequent stage from the serial communication branching device 16 in the path of the second priority (hereinafter referred to as path 2), and the slave number "6" is given to the slave 14 connected further subsequently thereto in path 2. In this manner, concerning the slaves 14 after the serial communication branching device 16, slave numbers are assigned thereto in order of the priority of the path. The allocation of the slave numbers will be described in detail later.

For example, the types A, B, C, . . . of the slaves 14 shown in FIG. 1, indicate the types of slaves 14, which are classified by the number of signal points and the functions of slaves, such as "type A: a slave with 32 input points and 24 output points", "type B: an analog input slave", etc.

Figure 2:
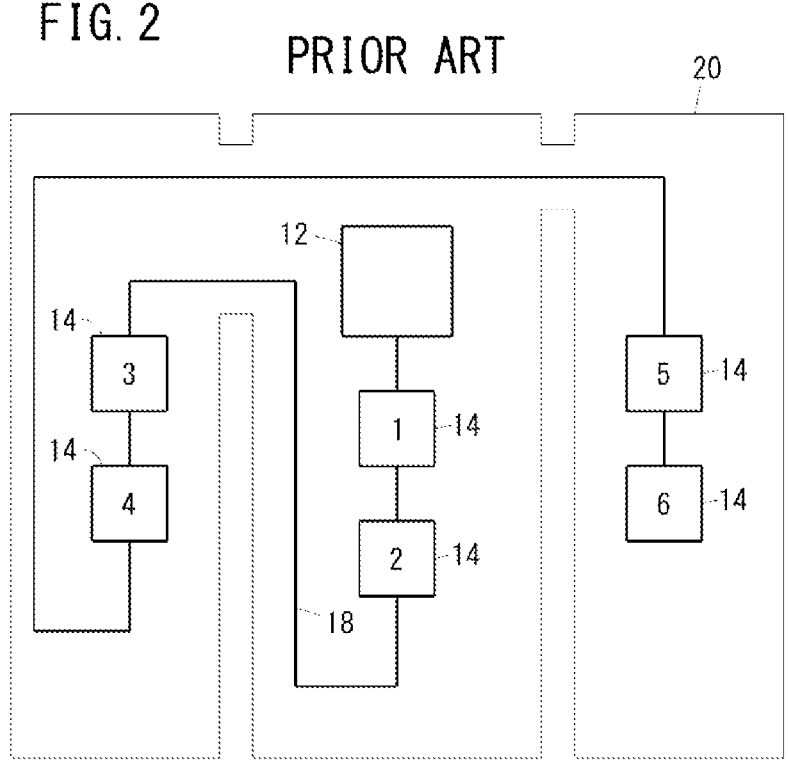
FIG. 2 illustrates an example of an arrangement of a master and six slaves in a conventional serial communication system that does not include a serial communication branching device, and an example of connection between signal lines that connect the same.
Figure 3:
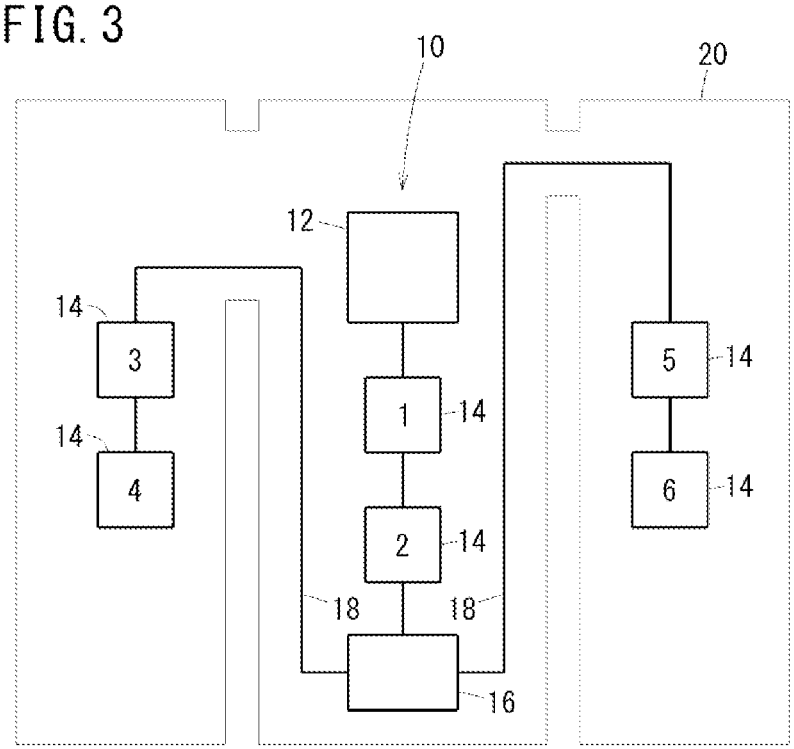
FIG. 3 illustrates an example of an arrangement of a master and six slaves in a serial communication system according to the embodiment, and an example of connection between signal lines that connect the same.

FIG. 2 illustrates an example of an arrangement of a master 12 and six slaves 14 in a conventional serial communication system that does not include the serial communication branching device 16, and an example of connection between the signal lines 18 that connect the same. FIG. 3 illustrates an example of an arrangement of a master 12 and six slaves 14 in a serial communication system 10 according to the present embodiment, and an example of connection between the signal lines 18 that connect the same. As shown in FIG. 2, if the master 12 and the plurality of slaves 14, which are arranged in a housing 20, are to be connected in a daisy chain, the wiring length of the signal lines 18 becomes long. In contrast thereto, according to the present embodiment, as shown in FIG. 3, because the serial communication system 10 includes the serial communication branching device 16, wiring only has to be carried out from the serial communication branching device 16 to each of the paths, and thus the wiring length of the signal lines 18 is shortened. The numbers assigned to the slaves 14 in FIGS. 2 and 3 are indicative of slave numbers, and such features are treated similarly in FIG. 4 and the figures thereafter.

Although the number of the slaves 14 connected between the master 12 and the serial communication branching device 16 is two, this number can be changed arbitrarily. For example, in the case that the number of slaves 14 connected between the master 12 and the serial communication branching device 16 is zero, the serial communication branching device 16 is connected directly to the subsequent stage from the master 12. Further, although the number of slaves 14 for each of the paths that are branched by the serial communication branching device 16 is two, the number of slaves 14 can be changed arbitrarily for each of such paths.

Figure 4:
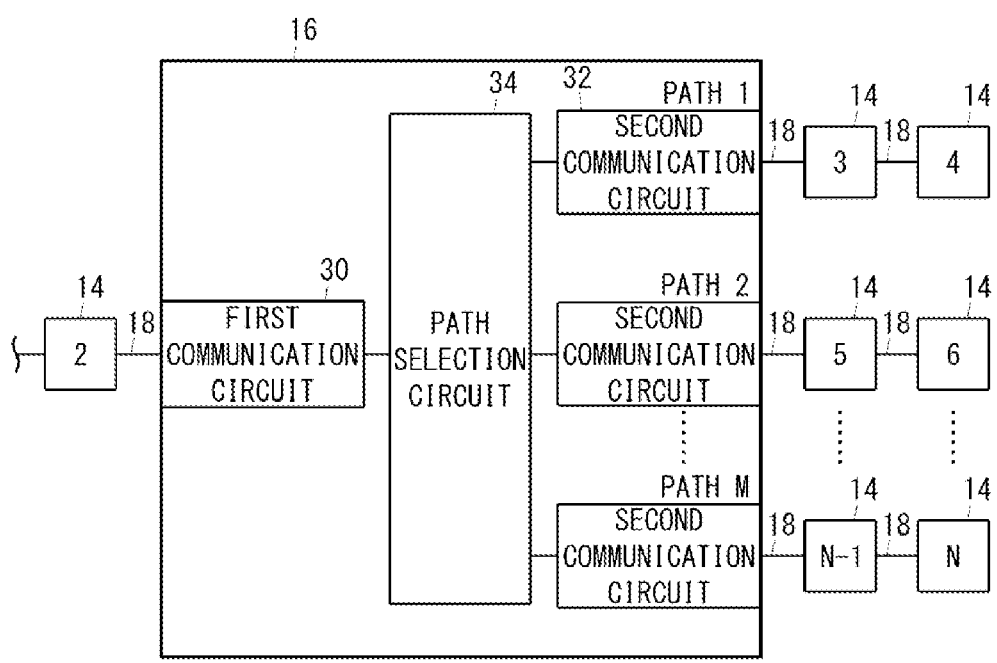
FIG. 4 is a schematic configuration diagram of a serial communication branching device shown in FIG. 1.

Next, with reference to FIG. 4, a description will be given concerning an outline configuration of the serial communication branching device 16. The serial communication branching device 16 is equipped with a first communication circuit 30, a plurality of (M number of) second communication circuits 32, and a path selection circuit 34. The first communication circuit 30 communicates with a slave 14 (slave number "2") that is connected to the preceding stage of the serial communication branching device 16. Consequently, the first communication circuit 30 is capable of carrying out communication with the master 12. The plurality of second communication circuits 32 communicate respectively with slaves 14 (slave numbers "3", "5", . . . , "N−1") of the paths connected to the subsequent stages from the serial communication branching device 16. Owing to this feature, the plurality of second communication circuits 32 are capable of carrying out communication with all of the slaves 14 (slave numbers "3" to "N") belonging to the plurality of paths. The path selection circuit 34 is disposed between the first communication circuit 30 and the plurality of second communication circuits 32, and carries out transmission and reception of signals between the first communication circuit 30 and the plurality of second communication circuits 32.

Upon receiving a transmission signal from the master 12 via the preceding slave 14 of the slave number "2", the path selection circuit 34 transmits the transmission signal to the first slave 14 of each of the paths 1 through M that are connected to the subsequent stages from the serial communication branching device 16. Owing to this feature, the transmission signal is transmitted to all of the slaves 14 (slave numbers "3" to "N") of each of the paths 1 through M. Responsive to the transmission signal transmitted by the master 12, in the event that a slave 14 connected to the subsequent stage from the serial communication branching device 16 returns a reply signal to the master 12, the path selection circuit 34 enables (selects) the path of the slave 14 that transmits the reply signal. Consequently, the serial communication branching device 16 is capable of transmitting signals from the enabled (selected) path to the master 12 via the two slaves 14 (slave numbers "2", "1") connected to the preceding side. For example, in the case that a reply signal is transmitted from the slave 14 of slave number "4", the path selection circuit 34 enables (selects) only path 1, and only signals transmitted from path 1 are sent to the slave 14 of slave number "2". Consequently, the serial communication branching device 16 can carry out transmission of reply signals to the master 12 in such a manner that the reply signals transmitted from the slaves 14 of the respective paths connected to the subsequent stage do not collide with each other.

Moreover, the master 12 adds (appends), to transmission signals, slave numbers of the destinations (slaves 14) to which the transmission signals are desired to be transmitted, and then transmits the transmission signals, and the slaves 14 having the slave numbers included within the transmission signals send back reply signals in response thereto.

Figure 5:
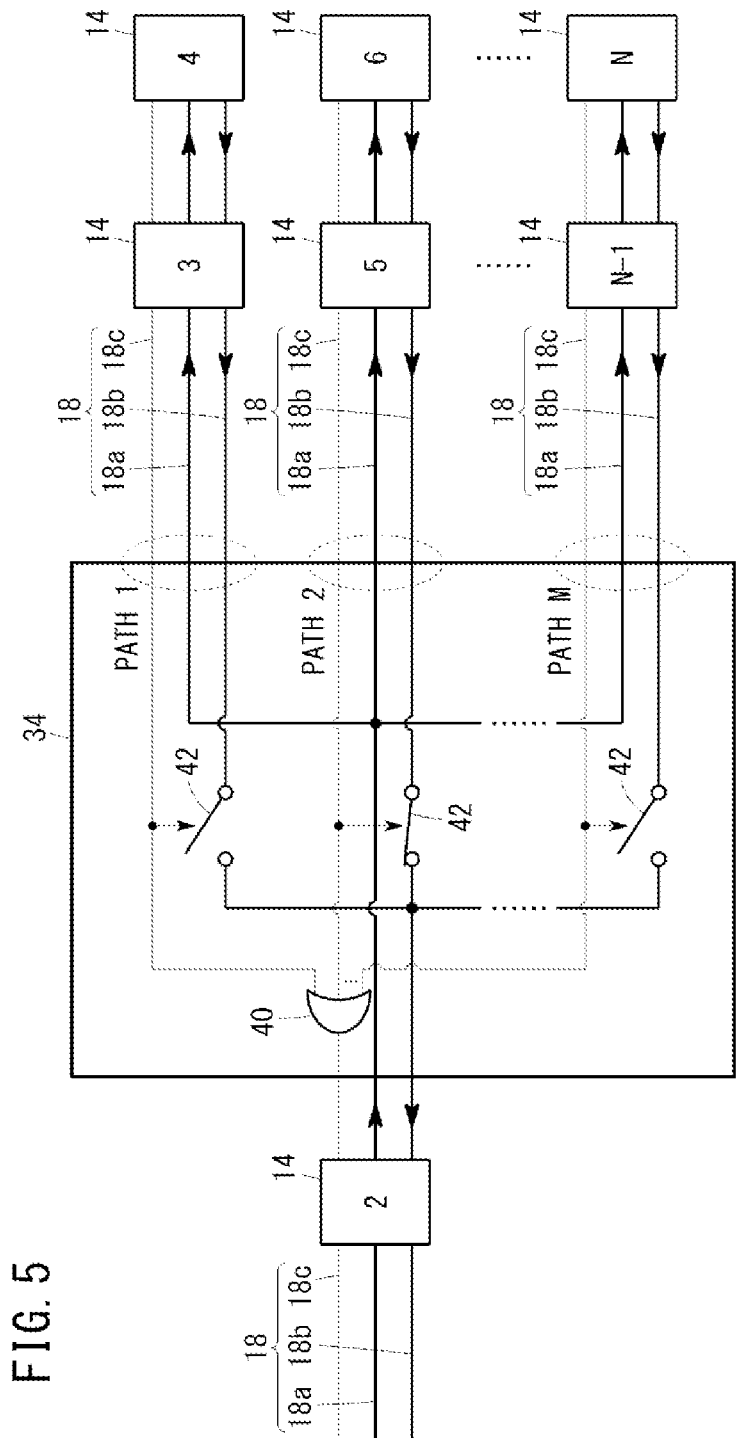
FIG. 5 is a first example of a configuration of a path selection circuit shown in FIG. 4.

Next, a detailed description will be given concerning the configuration of the path selection circuit 34. According to the present embodiment, three examples are presented and described as detailed configurations of the path selection circuit 34. FIG. 5 shows a first example of a configuration of the path selection circuit 34. In FIG. 5, illustration is omitted of the first communication circuit 30 and the plurality of (M number of) second communication circuits 32. In the case that the path selection circuit 34 is configured as shown in FIG. 5, when a slave 14 connected to the subsequent stage side from the serial communication branching device 16 transmits a reply signal, the slave 14 transmits a path selection signal, which serves to enable the path to which the slave 14 itself belongs. In addition, on the basis of the path selection signal, the path selection circuit 34 enables (selects) the path to which the slave 14 that transmits the reply signal belongs. The path selection circuit 34 includes a plurality of switches 42 for switching between whether or not to output the reply signals from the plurality of (M number of) paths to the slave 14 (slave number "2") connected to the preceding stage. The plural switches 42 are disposed corresponding to the respective paths. On the basis of the path selection signal, the path selection circuit 34 turns on the switch 42 of the path to which the slave 14 that transmits the reply signal belongs, whereby the path to which the slave 14 that transmits the reply signal belongs is enabled. The plural switches 42 are disposed respectively in reply signal lines 18*b* of the paths.

In this instance, the signal lines 18 that connect the master 12, the plurality of slaves 14, and the serial communication branching device 16 include transmission signal lines 18*a*, reply signal lines 18*b*, and path selection signal lines 18*c*. The transmission signal lines 18*a* are communication lines for transmitting transmission signals from the master 12, and the reply signal lines 18*b* are communication lines for transmitting reply signals from the slaves 14. The path selection signal lines 18*c* are communication lines for transmitting path selection signals from the slaves 14. Accordingly, each of the slaves 14 connected to the subsequent stage side from the serial communication branching device 16 outputs to the path selection circuit 34 a reply signal and a path selection signal via the reply signal line 18*b* and the path selection signal line 18*c* of the path to which the slave 14 itself belong.

To offer a further detailed description of the signal lines 18, it is noted that the transmission signal line 18*a* and the reply signal line 18*b* that are connected to the master 12 are branched into the M number of paths in the path selection circuit 34, and the M number of branched transmission signal lines 18*a* and the M number of branched reply signal lines 18*b* are connected to the slaves 14 of the respective paths. Further, the path selection signal line 18*c* that is connected to the master 12 is branched into the M number of paths via an OR circuit 40 provided in the path selection circuit 34, and the M number of branched path selection signal lines 18*c* are connected to the slaves 14 of the respective paths. Accordingly, by the OR circuit 40, the logical sum of the path selection signals from the respective paths is transmitted to the master 12. Consequently, path selection signals can be transmitted from one of the plurality of paths to the master 12.

The path selection circuit 34 turns on the switch 42 of the path corresponding to the path selection signal line 18*c* over which the path selection signal was transmitted. The switches 42 may be constituted by logic circuits, for example. For example, in the case that the switches 42 are constituted by AND circuits, reply signals from the reply signal lines 18*b* and path selection signals from the path selection signal lines 18*c* are input to the AND circuits. Accordingly, when a slave 14 that transmits a reply signal transmits a path selection signal (having a logical value of "1"), an ON state of the corresponding switch (AND circuit) 42 can be brought about. Therefore, the path to which the slave 14 that have transmitted the reply signal belongs becomes enabled, and the reply signal input to the corresponding switch (AND circuit) 42 can be transmitted to the side of the master 12.

For example, when the master 12 transmits via the transmission signal lines 18*a* a transmission signal having the slave number "6" added thereto, the transmission signal is received by all of the slaves 14, but only the slave 14 of slave number "6" transmits a reply signal. The reply signal is transmitted through the reply signal line 18b of path 2 to which the slave 14 of slave number "6" belongs. At this time, when the reply signal is output, the slave 14 (slave number "6") outputs a path selection signal (logical value of "1"). The path selection signal is transmitted through the path selection signal line 18c of path 2 to which the slave 14 of slave number "6" belongs. The path selection signal and the reply signal from the slave 14 of slave number "6" are input to the switch 42, which is constituted by the AND circuit disposed corresponding to path 2. Accordingly, by the path selection signal having the logical value of "1", the switch (AND circuit) 42 provided in the reply signal line 18b of path 2 is turned on, and the reply signal transmitted by the slave 14 (slave number "6") is transmitted through the two slaves 14 (slave numbers "2", "1") to the master 12. Moreover, In order to prevent signals of a plurality of paths from being transmitted simultaneously to the master 12, the path selection circuit 34 limits the plurality of switches 42 so as not to be turned on at the same time.

Figure 6:
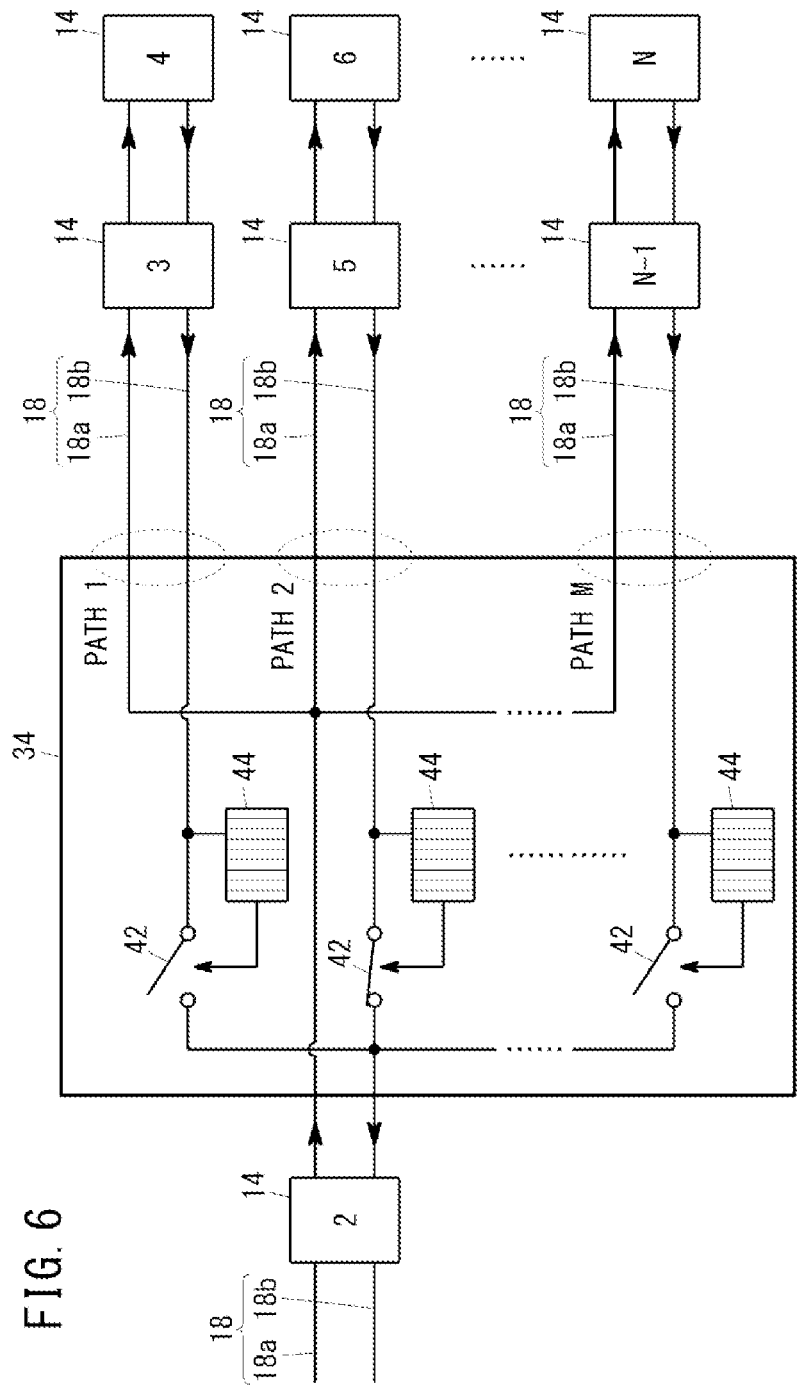
FIG. 6 is a second example of a configuration of the path selection circuit shown in FIG. 4.

FIG. 6 shows a second example of a configuration of the path selection circuit 34. The same reference characters are applied with respect to constituent elements that are the same as those of the first example (FIG. 5). Further, in FIG. 6, illustration is omitted of the first communication circuit 30 and the plurality of (M number of) second communication circuits 32. In the case that the path selection circuit 34 is configured as shown in FIG. 6, before transmitting a reply signal, the slave 14 connected to the subsequent stage side from the serial communication branching device 16 transmits a path selection signal (a predetermined pattern signal), which serves to enable the path to which the slave 14 itself belongs. In addition, on the basis of the path selection signal, the path selection circuit 34 enables (selects) the path to which the slave 14 that transmits the reply signal belongs. As with the first example 1 (FIG. 5), the path selection circuit 34 includes a plurality of switches 42 for switching between whether or not to output the reply signals from the plurality of (M number of) paths to the slave 14 (slave number "2") connected to the preceding stage. The plural switches 42 are disposed corresponding to the respective paths. On the basis of the path selection signal, the path selection circuit 34 turns on the switch 42 of the path to which the slave 14 that transmits the reply signal belongs, whereby the path to which the slave 14 that transmits a reply signal belongs is enabled. The plural switches 42 are disposed respectively in the reply signal lines 18b of the paths.

In this instance, the signal lines 18 that connect the master 12, the plurality of slaves 14, and the serial communication branching device 16 include transmission signal lines 18a and reply signal lines 18b. More specifically, the transmission signal line 18a and the reply signal line 18b that are connected to the master 12 are branched into the M number of paths in the path selection circuit 34, and the M number of branched transmission signal lines 18a and the M number of branched reply signal lines 18b are connected to the slaves 14 of the respective paths. Differently from the configuration shown in FIG. 5, the path selection signal lines 18c are not provided in the signal lines 18. Each of the slaves 14 connected to the subsequent stage side from the serial communication branching device 16 outputs, to the path selection circuit 34, a path selection signal and a reply signal via the reply signal line 18b of the path to which the slave 14 itself belong.

When the path selection circuit 34 detects a path selection signal, which is a predetermined pattern signal, that was transmitted via the reply signal line 18b, prior to the reply signals, the path selection circuit 34 turns on the switch 42 of a path corresponding to the reply signal line 18b over which the path selection signal was transmitted. More specifically, the path selection circuit 34 includes, in each of the paths, a detection circuit 44 that detects whether or not a path selection signal has been transmitted through the reply signal line 18b. When the detection circuit 44 of each of the paths detects a path selection signal, the detection circuit 44 turns on the switch 42 that corresponds to the reply signal line 18b over which the path selection signal was transmitted. For example, in the case that the switches 42 are constituted by AND circuits, when the path selection signal is detected thereby, the detection circuit 44 outputs a logical value of "1" to the switch (AND circuit) 42 that corresponds to the reply signal line 18b in which the path selection signal was detected, whereby the switch (AND circuit) 42 can be placed in an ON state. Accordingly, the slave 14 that transmits the reply signal also transmits the path selection signal, whereby the path to which the slave 14 itself belongs becomes enabled, and thereafter, the transmitted reply signal is output to the side of the master 12.

For example, when the master 12 transmits via the transmission signal lines 18a a transmission signal having the slave number "6" appended thereto, the transmission signal is received by all of the slaves 14. However, only the slave 14 of slave number "6" transmits a path selection signal (predetermined pattern signal), and thereafter, transmits a reply signal. The path selection signal and the reply signal are transmitted through the reply signal line 18b of path 2 to which the slave 14 of slave number "6" belongs. When the path selection signal is detected, the detection circuit 44 of path 2 outputs a logical value of "1" to the switch 42 that is constituted by the AND circuit of path 2. In accordance therewith, the switch 42 provided in the reply signal line 18b of path 2 is placed in an ON state, and thereafter, the reply signal transmitted by the slave 14 of slave number "6" is transmitted through the two slaves 14 (slave numbers "2", "1") to the master 12. Moreover, In order to prevent signals of a plurality of paths from being transmitted simultaneously to the master 12, the path selection circuit 34 limits the plurality of switches 42 so as not to be turned on at the same time.

Figure 7:
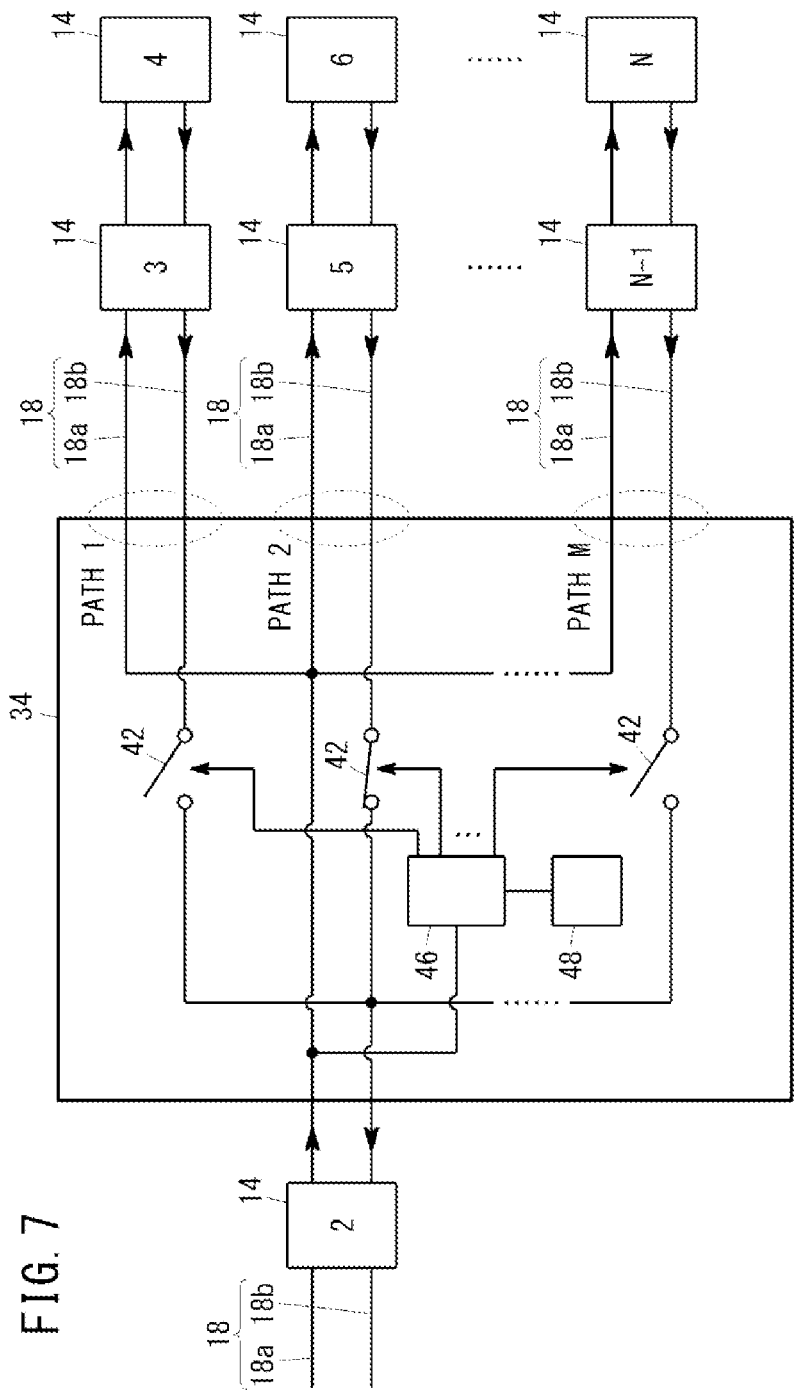
FIG. 7 is a third example of a configuration of the path selection circuit shown in FIG. 4.

FIG. 7 shows a third example of a configuration of the path selection circuit 34. The same reference characters are applied with respect to constituent elements that are the same as those of the first example (FIG. 5) or the second example (FIG. 6). Further, in FIG. 7, illustration is omitted of the first communication circuit 30 and the plurality of (M number of) second communication circuits 32. In the case that the path selection circuit 34 is configured as shown in FIG. 7, the slaves 14 connected to the subsequent stage side from the serial communication branching device 16 only transmit reply signals. In other words, differently from the first example or the second example, there is no need for the slaves 14 to transmit path selection signals. On the basis of a slave number included within the transmission signal transmitted by the master 12, the path selection circuit 34 enables (selects) the path to which the slave 14 that transmits the reply signal belongs. Similar to the first example and the second example, the path selection circuit 34 includes a plurality of switches 42 for switching between whether or not to output the reply signals from the plurality of (M number of) paths to the slave 14 (slave number "2") connected to the preceding stage. The plural switches 42 are disposed corresponding to the respective paths. On the basis of the slave number included within the transmission signal transmitted by the master 12, the path selection circuit 34 turns on the switch 42 of the path to which the slave 14 that transmits the reply signal belongs, whereby the path to which the slave 14 that transmits the reply signal belongs is enabled. The plural switches 42 are disposed respectively in the reply signal lines 18b of the paths. The signal lines 18 that connect the master 12, the plurality of slaves 14, and the serial communication branching device 16, similar to the case of the second example, include the transmission signal lines 18a and the reply signal lines 18b, whereas the path selection signal lines 18c are not included therein.

More specifically, the path selection circuit 34 includes a detection circuit 46 for detecting slave numbers included within the transmission signals transmitted via the transmission signal line 18a, and a table 48 in which there are stored, in association with each of the paths, slave numbers of the slaves 14 that belong to the paths. When a slave number included within a transmission signal is detected, then using the detected slave number and the table 48, the detection circuit 46 enables the path to which the slave 14 of the detected slave number (i.e., the slave 14 that transmits the reply signal) belongs. More specifically, using the detected slave number and the table 48, the detection circuit 46 selects the path to which the slave 14 of the detected slave number belongs, and turns on the switch 42 of the selected path, whereby the selected path is enabled.

For example, in the case that the switches 42 are constituted by AND circuits, the detection circuit 46 outputs a logical value of "1" to the switch 42 of the selected path, whereby the switch (AND circuit) 42 is placed in an ON state. Accordingly, the reply signal that was transmitted by the slave 14 of the detected slave number can be output to the side of the master 12.

For example, when the master 12 transmits via the transmission signal lines 18a a transmission signal having the slave number "6" added thereto, the transmission signal is received by all of the slaves 14, and together therewith, the detection circuit 46 detects the slave number "6" included within the transmission signal. Thus, using the table 48, the detection circuit 46 selects the path 2 to which the slave 14 of slave number "6" belongs, and outputs a logical value of "1" to the switch (AND circuit) 42 of the selected path 2. In accordance therewith, the switch 42 provided in the reply signal line 18b of path 2 is placed in an ON state. In addition, thereafter, the reply signal transmitted by the slave 14 of slave number "6" through the reply signal line 18b of path 2 is transmitted through the two slaves 14 (slave numbers "2", "1") to the master 12. Moreover, In order to prevent signals of a plurality of paths from being transmitted simultaneously to the master 12, the path selection circuit 34 limits the plurality of switches 42 so as not to be turned on at the same time.

Figure 8:
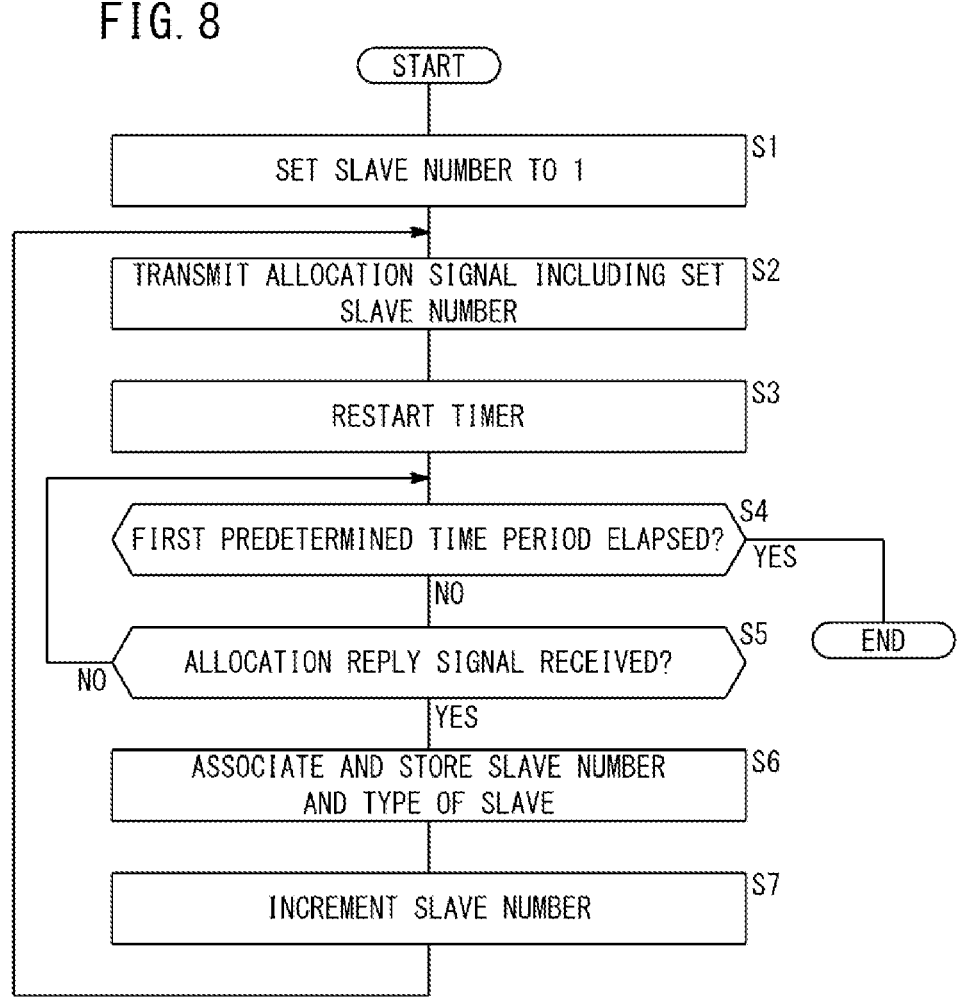
FIG. 8 is a flowchart showing operations of a slave number allocation process performed by a master.
Figure 9:
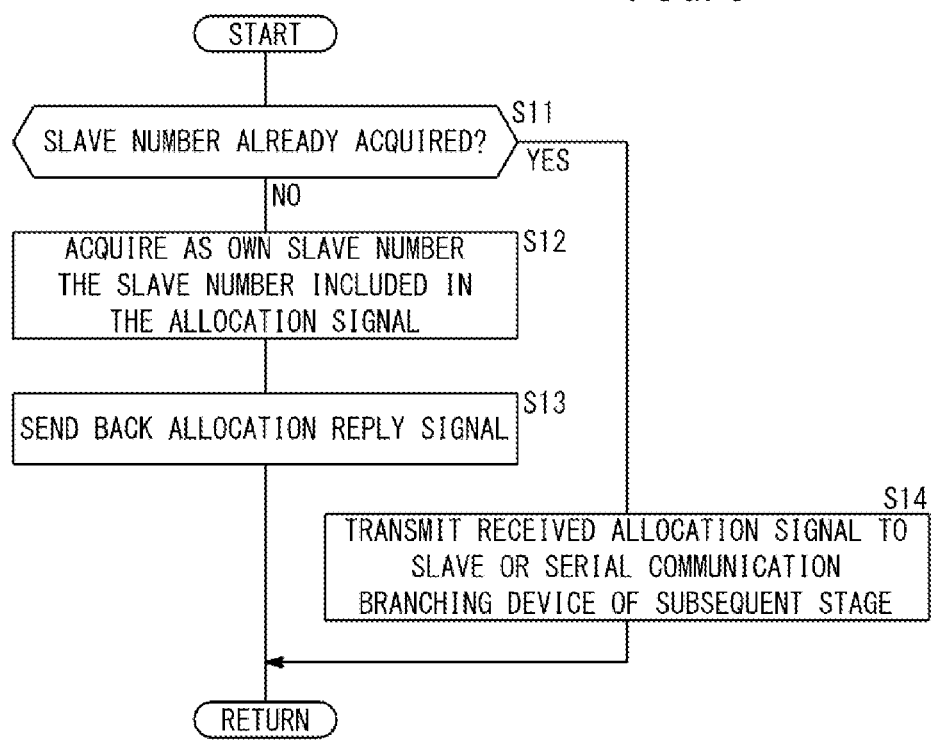
FIG. 9 is a flowchart showing operations of a slave number acquisition process performed by a slave.
Figure 10:
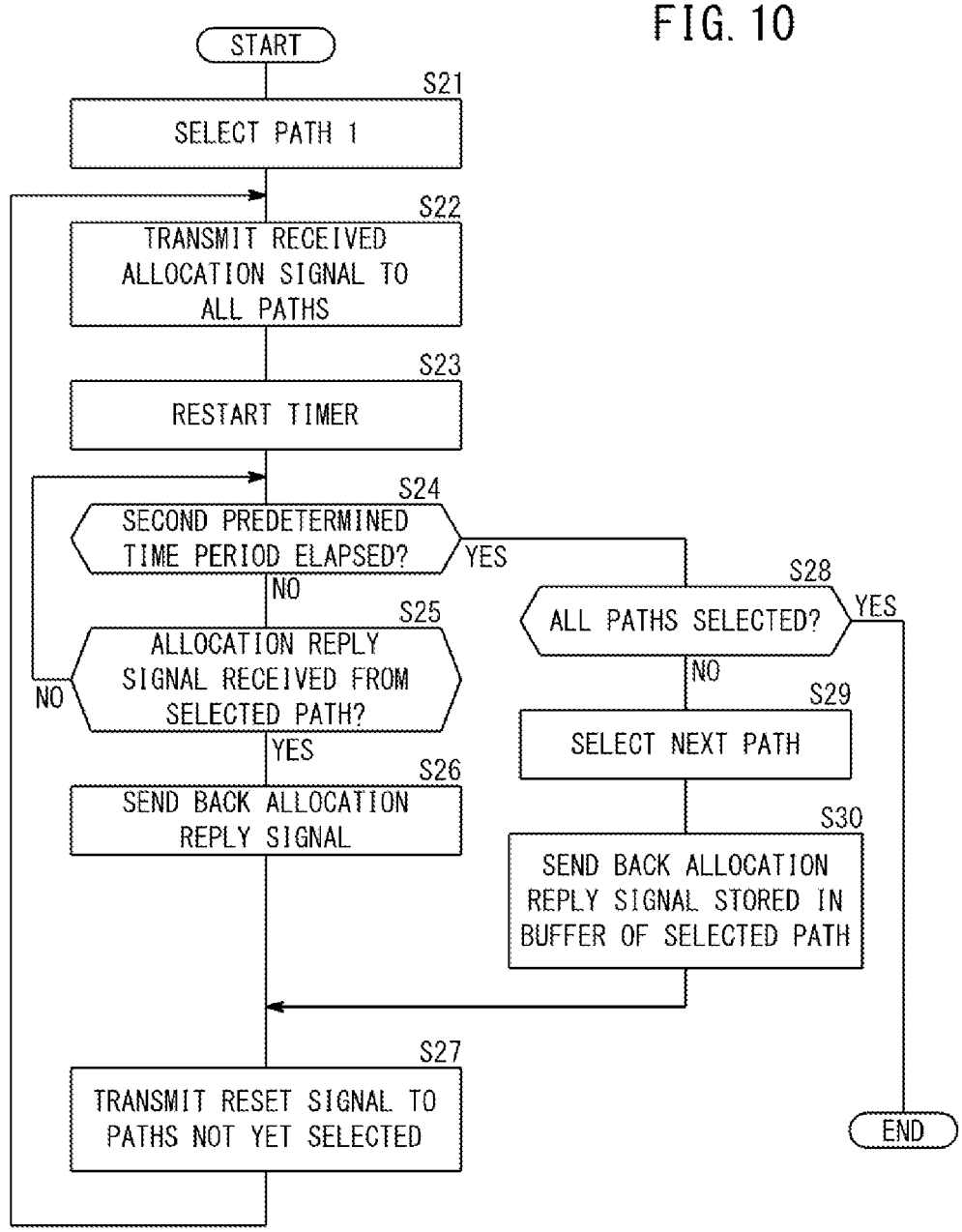
FIG. 10 is a flowchart showing operations of the slave number allocation process for respective paths performed by the serial communication branching device.

Next, a description will be given concerning allocation of the slave numbers. FIG. 8 is a flowchart showing operations of a slave number allocation process performed by the master 12, FIG. 9 is a flowchart showing operations of a slave number acquisition process performed by a slave 14, and FIG. 10 is a flowchart showing operations of the slave number allocation process for respective paths performed by the serial communication branching device 16.

At first, with reference to FIG. 8, operations of the slave number allocation process performed by the master 12 will be described. The master 12 may implement the process (slave number allocation process) shown in FIG. 8 at the time that the power source of the master 12 is turned on, or the process may be implemented on the basis of a command from an operator. The operations shown in FIG. 8 are performed by a control unit of the master 12.

The master 12 sets the slave number to "1" (step S1 of FIG. 8), and thereafter, an allocation signal in which the set slave number is included is transmitted to the slaves 14 connected to the subsequent stage (step S2). The allocation signal is transmitted through the transmission signal lines 18a. In addition, after having reset the timer, the master 12 starts the timer (step S3), and then determines whether or not the time measured by the timer has exceeded a first predetermined time period (fixed time period) (step S4).

In step S4, if it is determined that the first predetermined time period has not elapsed from start of the timer, then the master 12 determines whether or not an allocation reply signal has been transmitted from a slave 14 (step S5). The allocation reply signal includes an acquisition signal indicative of acquisition of the slave number, and a type signal indicative of the type of the slave 14 (for example, type A) that has acquired the slave number. The allocation reply signal is transmitted through the reply signal lines 18b.

If it is determined in step S5 that an allocation reply signal has not been transmitted, the process returns to step S4. On the other hand, if it is determined in step S5 that an allocation reply signal has been transmitted, the master 12 associates and stores the slave number (the currently set slave number) included within the allocation signal that was transmitted most recently in step S2, and the type of the slave 14 included within the allocation reply signal received most recently in step S5 (step S6).

Next, the master 12 increments the set slave number by one (step S7), the process returns to step S2, and the aforementioned operations are repeated. On the other hand, if it is determined in step S4 that the first predetermined time period has elapsed from start of the timer without the allocation reply signal being transmitted, the master 12 determines that the slave number acquisition process for all of the slaves 14 has come to an end, and the process is terminated. In this manner, allocation signals including slave numbers are transmitted from the master 12 sequentially from the slave number "1", in the manner of an allocation signal including the slave number "1", an allocation number including the slave number "2", and an allocation number including the slave number "3", and so forth.

Next, with reference to FIG. 9, a process for acquiring slave numbers for the slaves 14 will be described. The operations shown in FIG. 9 are performed by control units of the slaves 14. If the allocation signal is transmitted to a slave 14 from the master 12, another slave 14, or the serial communication branching device 16 connected to the previous stage of the slave 14, the slave 14 determines whether or not the slave 14 has already acquired a slave number (step S11). If it is determined in step S11 that the slave 14 has not yet acquired a slave number, then the slave 14 acquires and stores as its own slave number the slave number included within the allocation signal that was transmitted thereto (step S12). Next, the slave 14 replies to the master 12 with the allocation reply signal, which includes the acquisition signal indicative of acquisition of the slave number, and the type signal indicative of the type of the slave 14 that has acquired the slave number (step S13), and terminates the process. In the case that the slave number included within the allocation signal is acquired as its own slave number, the slave 14 does not transmit the allocation signal to the subsequent slave 14 or the subsequent serial communication branching device 16 that is connected to the subsequent stage.

On the other hand, if it is determined in step S11 that the slave 14 has already acquired a slave number, then in step S14, the slave 14 directly transmits without modification the allocation signal that was transmitted thereto to the subsequent slave 14 or the subsequent serial communication branching device 16 connected to the subsequent stage (next stage), whereupon the process is terminated. In the case that a slave 14 is not connected to the subsequent stage, the process is terminated directly without performing step S14. Consequently, slave numbers 1, 2, . . . , are allocated sequentially in order from the slave 14 nearest to the master 12. However, since the slaves 14 connected after the serial communication branching device 16 are connected to the respective paths in parallel, the slaves 14 of the respective paths acquire the same slave numbers in parallel. Thus, according to the present embodiment, the slave numbers are allocated sequentially to the slaves 14 of paths having a higher priority.

With reference to FIG. 10, a description will be given of operations of the slave number allocation process for respective paths of the serial communication branching device 16. The operations shown in FIG. 10 are performed by a control unit of the serial communication branching device 16. The serial communication branching device 16 first selects path 1 (step S21). In accordance therewith, only the switch 42 corresponding to the selected path 1 is turned on, whereas the switches 42 corresponding to paths that are not selected are left off. Consequently, only signals transmitted from the slaves 14 of path 1 are able to be transmitted to the master 12.

Next, the serial communication branching device 16 transmits to the slaves 14 of the respective paths connected to the subsequent stage the allocation signal that was received from the slave 14 (slave number "2") of the previous stage (step S22). Owing thereto, in principle, one of the slaves 14 of each of the paths acquires the slave number included within the allocation signal, and the slaves 14 of the respective paths that have received the slave number become able to transmit the allocation reply signal. In this instance, the serial communication branching device 16 includes a buffer (not shown) that stores allocation reply signals transmitted from the paths. The buffer stores therein one allocation reply signal for each of the paths, and when an allocation reply signal is newly transmitted, the buffer overwrites and stores the newly transmitted allocation reply signal anew. Consequently, in principle, every time an allocation signal is transmitted in a path, the allocation reply signal of the path stored in the aforementioned buffer is overwritten and stored. Moreover, the buffer may store the allocation reply signals of paths other than path 1 having the highest priority.

In addition, after having reset the timer, the serial communication branching device 16 starts the timer (step S23), and then determines whether or not the time measured by the timer has exceeded a second predetermined time period (fixed time period) (step S24). The second predetermined time period is shorter than the first time period that was stated in relation to step S4 of FIG. 8.

In step S24, if it is determined that the second predetermined time period has not elapsed from start of the timer, then the serial communication branching device 16 determines whether or not an allocation reply signal has been transmitted from a slave 14 of the selected path (step S25). If it is determined in step S25 that an allocation reply signal has not been transmitted, the process returns to step S24. On the other hand, if it is determined in step S25 that the allocation reply signal has been transmitted, the serial communication branching device 16 sends back to the master 12 the allocation reply signal that was transmitted from the selected path (step S26). In addition, the serial communication branching device 16 transmits a reset signal to the paths that have not yet been selected (step S27), whereupon the process returns to step S22. The reset signal is a signal for resetting (canceling) the slave numbers acquired by the slaves 14. This is because, since the allocation signal is transmitted with respect to all of the paths, the slaves 14 of the unselected paths also acquire the slave number.

On the other hand, if it is determined in step S24 that the second predetermined time period has elapsed from start of the timer without the allocation reply signal being transmitted, the serial communication branching device 16 determines that slave numbers have been acquired by all of the slaves of the selected path, whereupon the process proceeds to step S28. In step S28, the serial communication branching device 16 determines whether or not all of the paths have been selected. If it is determined in step S28 that all of the paths have been selected, the process is brought to an end, and if it is determined that all of the paths have not been selected, the serial communication branching device 16 selects a path having the next highest priority after the path that is currently selected (step S29). In accordance therewith, only the switch 42 corresponding to the newly selected path is turned on, whereas the switches 42 corresponding to paths that are not selected are turned off. Consequently, only signals transmitted from the slaves 14 of the newly selected path are able to be transmitted to the master 12.

Next, the serial communication branching device 16 sends back to the master 12 the allocation reply signal of the path that was newly selected and is stored in the buffer (step S30), whereupon the process proceeds to step S27 and the aforementioned operations are repeated. More specifically, in the case that an allocation reply signal has not been transmitted from the slaves 14 of the currently selected path, even though the second time period has elapsed from transmission of the allocation signal, slave numbers are allocated to all of the slaves 14 of the currently selected path. In this case, among the paths that have not yet been selected, since the slave number included within the allocation signal is allocated to the first slave 14 of the path to be selected henceforth, the allocation reply signal of the newly selected path that are stored in the buffer is sent back directly and without modification to the master 12.

Figure 11A:
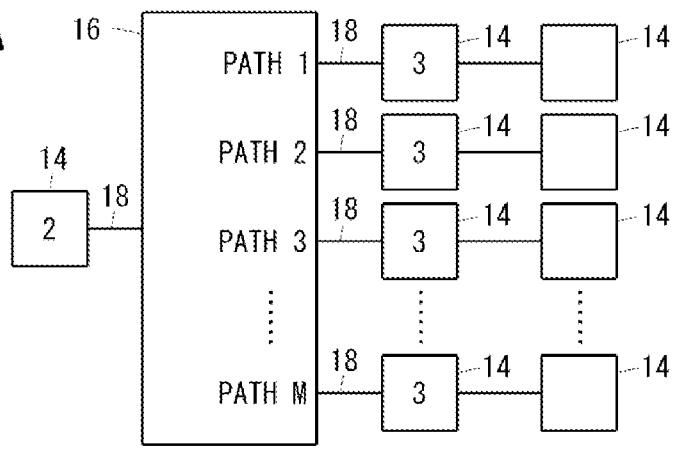
FIGS. 11A to 11C are diagrams for describing in detail an example of allocation of slave numbers for respective paths that have been branched by the serial communication branching device.
Figure 11B:
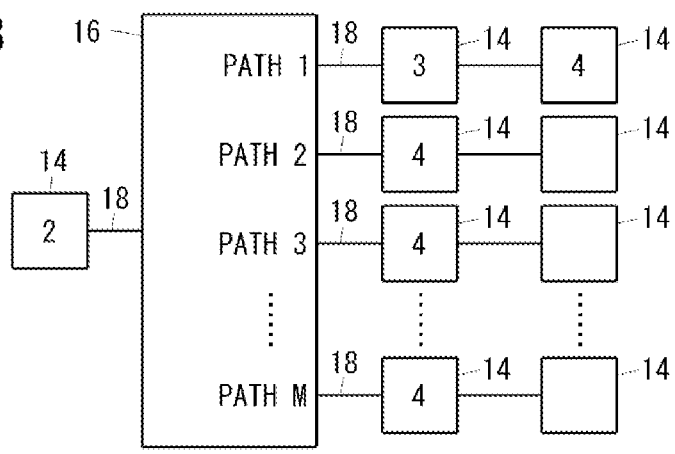
Figure 11C:
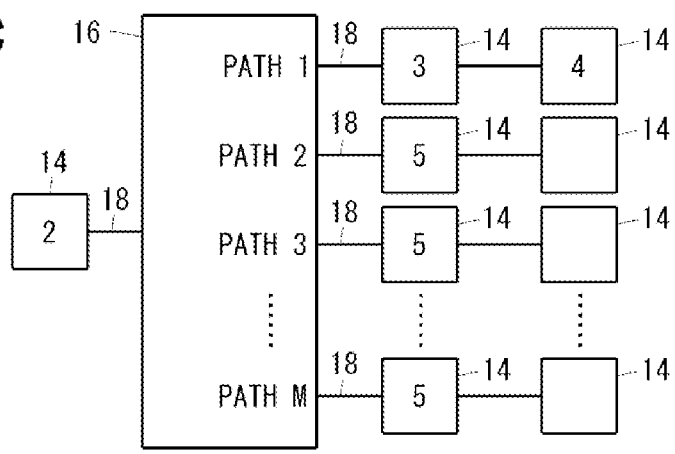

Next, using FIGS. 11A to 11C, a detailed example of allocation of the slave numbers will briefly be described. It is noted that the following description is premised on the assumption that all of the slaves 14 connected to the subsequent stage side of the serial communication branching device 16 are initially in a state such that the slave numbers thereof are undecided. Initially, the serial communication branching device 16 selects path 1 in step S21 of FIG. 10, and in step S22, an allocation signal which has been transmitted from the slave 14 of the previous stage (slave number "2") is in turn transmitted to all of the paths. In this instance, the slave number included within the allocation signal that the serial communication branching device 16 receives first is set to "3". Therefore, as shown in FIG. 11A, the first slaves 14 of the respective paths acquire as their own slave numbers the slave number "3" included within the allocation signal. The first slaves 14 of the respective paths that have acquired the slave number "3" output allocation reply signals to the serial communication branching device 16, however, since path 1 is the selected path, in step S26, only the allocation reply signal from path 1 is sent back to the master 12. At this time, the allocation reply signals that have been transmitted by the first slaves 14 of the respective paths are stored in the non-illustrated buffer of the serial communication branching device 16. In addition, in step S27, the serial communication branching device 16 transmits reset signals to the paths that have not yet been selected, and therefore, the slave numbers "3" acquired by the first slaves 14 of path 2 through path M are canceled. Consequently, the slave numbers of the first slaves 14 of path 2 through path M are once again placed in an undecided state. It should be noted that, in FIGS. 11A through 11C, slaves 14 for which the slave numbers thereof are undecided are shown as blank squares.

Then, in step S22, the serial communication branching device 16 transmits to all of the paths an allocation signal including the slave number "4" which was transmitted anew from the slave 14 (slave number "2") of the preceding stage. Therefore, as shown in FIG. 11B, in relation to path 1, since the first slave 14 of path 1 already has acquired its slave number, the second slave 14 for which the slave number thereof is undecided acquires as its own slave number the slave number "4" included within the allocation signal. Further, in relation to path 2 through path M, the first slaves 14 thereof acquire as their own slave numbers the slave number "4" included within the allocation signal. Accordingly, in relation to path 1, the second slave 14 transmits an allocation reply signal to the serial communication branching device 16, whereas in relation to path 2 through path M, the first slaves 14 thereof transmit allocation reply signals to the serial communication branching device 16.

However, because path 1 is selected, in step S26, only the allocation reply signal from path 1 is sent back to the master 12. At this time, the transmitted allocation reply signals of the respective paths are stored in the aforementioned buffer of the serial communication branching device 16. In addition, in step S27, the serial communication branching device 16 transmits reset signals to the paths that have not yet been selected, and therefore, the slave numbers "4" acquired by the first slaves 14 of path 2 through path M are canceled. Consequently, the slave numbers of the first slaves 14 from path 2 through path M are once again placed in an undecided state.

Then, in step S22, the serial communication branching device 16 transmits to all of the paths an allocation signal including the slave number "5" which was transmitted anew from the slave 14 (slave number "2") of the preceding stage. Therefore, as shown in FIG. 11C, since the first and the second slaves 14 of path 1 already have acquired their slave numbers, in relation to the path 1, the slave number "5" included within the allocation signal is not acquired as its own slave number. Further, in relation to path 2 through path M, the first slaves 14 thereof acquire as their own slave numbers the slave number "5" included within the allocation signal. Accordingly, without allocation reply signals from path 1 being transmitted to the serial communication branching device 16, in relation to path 2 through path M, the first slaves 14 thereof transmit allocation reply signals to the serial communication branching device 16. At this time, the transmitted allocation reply signals from path 2 through path M are stored in the aforementioned buffer of the serial communication branching device 16.

Since path 1 is currently selected, the serial communication branching device 16 does not receive the allocation reply signal from path 1, even if the second time period has elapsed. For this reason, the routine branches to the answer YES at step S24, and in step S28, the serial communication branching device 16 determines whether or not all of the paths have been selected. Further, because path 2 through path M are not selected, the answer NO is branched to at step S28, and in step S29, the serial communication branching device 16 selects path 2 as the next path. In addition, in step S30, the serial communication branching device 16 transmits to the master 12 the allocation reply signal of path 2 that is stored in the buffer. In addition, in step S27, the serial communication branching device 16 transmits reset signals to the paths that have not yet been selected, and therefore, the slave numbers "5" acquired by the first slaves 14 of path 3 through path M are canceled. Consequently, the slave numbers of the first slaves 14 of path 3 through path M are once again placed in an undecided state.

By performing such operations, the slave numbers as shown in FIG. 1 are allocated respectively to the slaves 14.

In this manner, the serial communication branching device 16 of the present embodiment serves to carry out branching of the plurality of slaves 14 into a plurality of paths, in the case that serial communication is carried out between the master 12 and the plurality of slaves 14 that are connected to the master 12 by a daisy chain. The serial communication branching device 16 is equipped with a first communication circuit 30 that carries out communication with the master 12 connected to a preceding stage side, a plurality of second communication circuits 32 that carry out communication with slaves 14 of the paths connected to a subsequent stage side, and a path selection circuit 34 disposed between the first communication circuit 30 and the second communication circuits 32, wherein, in the case that a slave 14 connected on the subsequent stage side transmits a reply signal to the master 12 responsive to a transmission signal transmitted from the master 12, the path selection circuit 34 selects, from among the paths, a path of the slave 14 that transmits the reply signal, and outputs the reply signal from the selected path to the master 12 connected to the preceding stage side.

By providing the serial communication branching device 16, the wiring length of the signal lines 18 that connect the master 12 and the plurality of slaves 14 by a daisy chain can be made shorter. Further, transmission of reply signals to the master 12 can be performed in such a manner that the reply signals transmitted from the slaves 14 of the respective paths connected to the subsequent stage do not collide with each other.

The path selection circuit 34 may select the path on the basis of a path selection signal sent from the slave 14 that transmits the reply signal. In accordance with this feature, it is possible to reliably return to the master 12 the reply signals transmitted by the slaves 14 responsive to the transmission signals transmitted by the master 12. At this time, the path selection circuit 34 may include the switches 42 for switching between whether or not the reply signals from the plurality of paths are output to the master 12 connected to the preceding stage side, and on the basis of the path selection signal, one of the switches 42 corresponding to the path of the slave 14 that transmits the reply signal may be turned on. In accordance with this feature, with a simple configuration, it is possible to reliably return to the master 12 the reply signals transmitted by the slaves 14 responsive to the transmission signals transmitted by the master 12.

The serial communication branching device 16 and the slaves 14 of the plurality of paths may be connected by the transmission signal lines 18a, the reply signal lines 18b, and the path selection signal lines 18c provided corresponding respectively to the plurality of paths, and the path selection circuit 34 may turn on the switch 42 of the path corresponding to the path selection signal line 18c that has transmitted the path selection signal. The serial communication branching device 16 and the slaves 14 of the plurality of paths may be connected by the transmission signal lines 18a and the reply signal lines 18b provided corresponding respectively to the plurality of paths. When the path selection circuit 34 detects the path selection signal that the slave 14 that transmits the reply signal has transmitted through the reply signal line 18b prior to transmission of the reply signal, the path selection circuit 34 may turn on the switch 42 of the path corresponding to the reply signal line 18b that has transmitted the path selection signal.

Slave numbers may be assigned respectively to the plurality of slaves 14, the master 12 may transmit a transmission signal to which a slave number is appended, a slave 14 of the slave number that is appended to the transmission signal transmits the reply signal, and the path selection circuit 34 may select the path of the slave 14 that transmits the reply signal on the basis of the slave number included within the transmission signal. In accordance with this feature, it is possible to reliably return to the master 12 the reply signals transmitted by the slaves 14 responsive to the transmission signals transmitted by the master 12. The path selection circuit 34 may include the table 48 in which there are stored, in association with the paths, slave numbers of the slaves 14 that belong to the paths, and using the table 48 and the slave numbers appended to the transmission signals, the path selection circuit 34 may select the path of the slave 14 that transmits the reply signal. At this time, the path selection circuit 34 may include a plurality of switches 42 for switching between whether or not the reply signals from the plurality of paths are output to the master 12 connected to the preceding stage side, and based on the slave number included within the transmission signal, one of the switches 42 corresponding to the path of the slave 14 that transmits the reply signal may be turned on. In accordance with this feature, with a simple configuration, it is possible to reliably return to the master 12 the reply signal transmitted by the slave 14 responsive to the transmission signal transmitted by the master 12.

In the case that an allocation signal for allocating the slave numbers from the master 12 to the slaves 14 is received, the path selection circuit 34 may sequentially select one from among the plurality of paths, whereby the slave numbers are allocated to the slaves 14 of each of the paths. In accordance with this feature, it is possible to appropriately allocate slave numbers with respect to the respective slaves 14 that are branched into a plurality of paths by the serial communication branching device 16. The path selection circuit 34 may select the paths in accordance with a predetermined order. Owing thereto, it is possible to allocate the slave numbers sequentially in order from the slaves 14 of paths having a higher priority. Moreover, the path selection circuit 34 may sequentially select the paths randomly.

In this instance, the master 12 transmits the allocation signal including a slave number to the slaves 14 or the serial communication branching device 16 connected to the subsequent stage, and when an allocation reply signal is transmitted from one of the slaves 14, the master 12 retransmits the allocation signal including a new slave number incremented by one from the previously transmitted slave number. Further, when a slave 14 to which a slave number is not allocated receives the allocation signal, the slave 14 acquires the slave number of the received allocation signal as its own slave number, and together therewith, the slave 14 transmits the allocation reply signal to the master 12, the preceding slave 14, or the serial communication branching device 16 that is connected to the preceding stage. Conversely, when a slave 14 to which a slave number is allocated receives the allocation signal, the slave 14 transmits the received allocation signal to the subsequent slave 14 or the serial communication branching device 16 that is connected to the subsequent stage. The path selection circuit 34 selects one of the plurality of paths, transmits the received allocation signal to the slaves 14 of all of the paths, and transmits the allocation reply signal from the selected path to the master 12 or the slave 14 connected to the preceding stage. Further, in the case that, after transmitting the allocation signal, an allocation reply signal has not been transmitted from the selected path for a predetermined period of time or greater, the path selection circuit 34 selects a path which has not yet been selected.

At this time, the path selection circuit 34 cancels the slave numbers that were acquired by the slaves 14 of the paths which have not yet been selected, and therefore, slave numbers can be allocated appropriately to the slaves 14 of each of the paths, and the same slave number is not allocated to a plurality of the slaves 14.

While the invention has been particularly shown and described with reference to preferred embodiments, it will be understood that variations and modifications can be effected thereto by those skilled in the art without departing from the scope of the invention as defined by the appended claims.

What is claimed is:

1. A serial communication branching device, which in a case that serial communication is carried out between a master and a plurality of slaves connected to the master by a daisy chain, branches the plurality of slaves into a plurality of paths, comprising:
a first communication circuit configured to carry out communication with the master connected to a preceding stage side of the serial communication branching device;
a plurality of second communication circuits configured to carry out communication with the slaves of the paths connected to a subsequent stage side of the serial communication branching device; and
a path selection circuit disposed between the first communication circuit and the second communication circuits, wherein, in a case that one slave of the slaves connected on the subsequent stage side transmits a reply signal to the master responsive to a transmission signal transmitted from the master, the path selection circuit selects, from among the paths, a path of the one slave that transmits the reply signal, and outputs the reply signal of the selected path to the master connected to the preceding stage side.

2. The serial communication branching device according to claim 1, wherein the path selection circuit selects the path, based on a path selection signal sent from the one slave that transmits the reply signal.

3. The serial communication branching device according to claim 2, wherein the path selection circuit includes a plurality of switches configured to switch between whether or not the reply signals from the plurality of paths are output to the master connected to the preceding stage side, and based on the path selection signal, one of the switches corresponding to the path of the one slave that transmits the reply signal is turned on.

4. The serial communication branching device according to claim 3, wherein:
the serial communication branching device and the slaves of the plurality of paths are connected by transmission signal lines, reply signal lines, and path selection signal lines provided corresponding respectively to the plurality of paths; and the path selection circuit turns on, among the switches, a switch of the path corresponding to one of the path selection signal lines through which the path selection signal has been transmitted.

5. The serial communication branching device according to claim 3, wherein:

the serial communication branching device and the slaves of the plurality of paths are connected by transmission signal lines and reply signal lines provided corresponding respectively to the plurality of paths; and when the path selection circuit detects the path selection signal that the one slave that transmits the reply signal has transmitted through one of the reply signal lines prior to transmission of the reply signal, the path selection circuit turns on, among the switches, a switch of the path corresponding to the one of the reply signal lines through which the path selection signal has been transmitted.

6. The serial communication branching device according to claim 4, wherein the plurality of switches are provided in the reply signal lines corresponding respectively to the paths.

7. The serial communication branching device according to claim 1, wherein:

a slave number is assigned to each of the plurality of slaves;

the master transmits the transmission signal to which the slave number is appended;

one of the slaves that has the slave number appended to the transmission signal transmits the reply signal; and the path selection circuit selects the path of the one slave that transmits the reply signal, based on the slave number included within the transmission signal.

8. The serial communication branching device according to claim 7, wherein the path selection circuit includes a table storing therein, in association with each of the paths, the slave number of each of the slaves that belong to the paths, and using the table and the slave number appended to the transmission signal, selects the path of the one slave that transmits the reply signal.

9. The serial communication branching device according to claim 7, wherein the path selection circuit includes a plurality of switches configured to switch between whether or not the reply signals from the plurality of paths are output to the master connected to the preceding stage side, and based on the slave number included within the transmission signal, one of the switches corresponding to the path of the one slave that transmits the reply signal is turned on.

10. The serial communication branching device according to claim 1, wherein, in a case that an allocation signal for allocating one of slave numbers from the master to one of the slaves is received, the path selection circuit sequentially selects one from among the plurality of paths, whereby the slave numbers are allocated to the slaves of each of the paths.

11. The serial communication branching device according to claim 10, wherein the path selection circuit selects the paths in accordance with a predetermined order.

12. The serial communication branching device according to claim 10, wherein:

the master transmits the allocation signal including the slave number to the slaves or the serial communication branching device connected to the subsequent stage, and when an allocation reply signal is transmitted from one of the slaves, the master retransmits the allocation signal including a new slave number incremented by one from the previously transmitted slave number;

when a slave to which a slave number is not allocated receives the allocation signal, the slave acquires the slave number of the received allocation signal as its own slave number, and the slave transmits the allocation reply signal to the master, another slave, or the serial communication branching device that is connected to the preceding stage, whereas when a slave to which a slave number is allocated receives the allocation signal, the slave transmits the received allocation signal to another slave or the serial communication branching device that is connected to the subsequent stage; and the path selection circuit selects one of the plurality of paths, transmits the received allocation signal to the slaves of all of the paths, and transmits the allocation reply signal from the selected path to the master or the slave connected to the preceding stage, and in a case that, after transmitting the allocation signal, the allocation reply signal has not been transmitted from the selected path for a predetermined period of time or greater, the path selection circuit selects a path which has not yet been selected.

13. The serial communication branching device according to claim 12, wherein the path selection circuit cancels the slave numbers that were acquired by the slaves of the paths which have not yet been selected.

14. A serial communication system comprising:

a serial communication branching device a master; and a plurality of slaves, wherein, in a case that serial communication is carried out between the master and the plurality of slaves connected to the master by a daisy chain, the serial communication branching device branches the plurality of slaves into a plurality of paths, and the serial communication branching device comprises:

a first communication circuit configured to carry out communication with the master connected to a preceding stage side of the serial communication branching device;

a plurality of second communication circuits configured to carry out communication with the slaves of the paths connected to a subsequent stage side of the serial communication branching device; and a path selection circuit disposed between the first communication circuit and the second communication circuits, wherein, in a case that one slave of the slaves connected on the subsequent stage side transmits a reply signal to the master responsive to a transmission signal transmitted from the master, the path selection circuit selects, from among the paths, a path of the one slave that transmits the reply signal, and outputs the reply signal of the selected path to the master connected to the preceding stage side.

* * * * *